United States Patent
Brockbank et al.

(10) Patent No.: US 9,166,888 B1
(45) Date of Patent: Oct. 20, 2015

(54) CONFIGURATION DATA

(71) Applicant: Metaswitch Networks Ltd, Enfield (GB)

(72) Inventors: Robert Brockbank, San Francisco, CA (US); Shaun Crampton, San Francisco, CA (US)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 14/267,798

(22) Filed: May 1, 2014

(51) Int. Cl.
| | |
|---|---|
| *H04J 14/00* | (2006.01) |
| *H04L 12/24* | (2006.01) |
| *H04B 10/27* | (2013.01) |
| *H04L 12/751* | (2013.01) |
| *H04L 12/723* | (2013.01) |
| *H04J 14/02* | (2006.01) |
| *H04B 10/00* | (2013.01) |

(52) U.S. Cl.
CPC .............. *H04L 41/12* (2013.01); *H04B 10/27* (2013.01); *H04J 14/0227* (2013.01); *H04L 45/02* (2013.01); *H04L 45/50* (2013.01)

(58) Field of Classification Search
CPC ............. H04J 14/0257; H04J 14/0267; H04Q 11/0062; H04Q 2011/0086; H04Q 2011/0073
See application file for complete search history.

(56) References Cited

U.S. PATENT DOCUMENTS

| | | | |
|---|---|---|---|
| 6,256,295 B1* | 7/2001 | Callon | 370/254 |
| 2007/0195700 A1* | 8/2007 | Katoh et al. | 370/235 |
| 2008/0279101 A1* | 11/2008 | Wu et al. | 370/235 |
| 2010/0074623 A1 | 3/2010 | Skoog et al. | |
| 2010/0220996 A1 | 9/2010 | Lee et al. | |
| 2013/0077970 A1 | 3/2013 | Lee et al. | |

* cited by examiner

*Primary Examiner* — Daniel Dobson
(74) *Attorney, Agent, or Firm* — EIP US LLP

(57) ABSTRACT

Measures for use in generating path configuration data for an optical network. A least cost path calculation process is performed on a network graph representation of the optical network to generate path configuration data for the optical network. Performing the least cost path calculation process comprises performing a network graph expansion process on the network graph representation of the optical network to obtain an expanded network graph representation of the optical network. Performing the network graph expansion process comprises determining data identifying the possible expansion paths to each optical node, the cost of each path and the available wavelengths for each path, grouping together wavelength and path data for paths of equal cost, and at one or more nodes, identifying a subset of one or more wavelengths and performing a wavelength pruning operation.

26 Claims, 11 Drawing Sheets

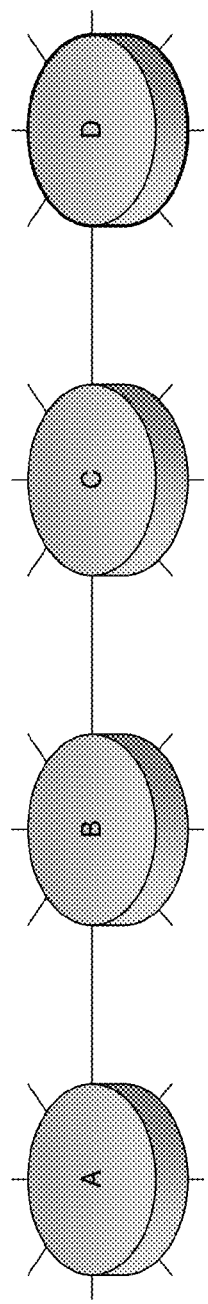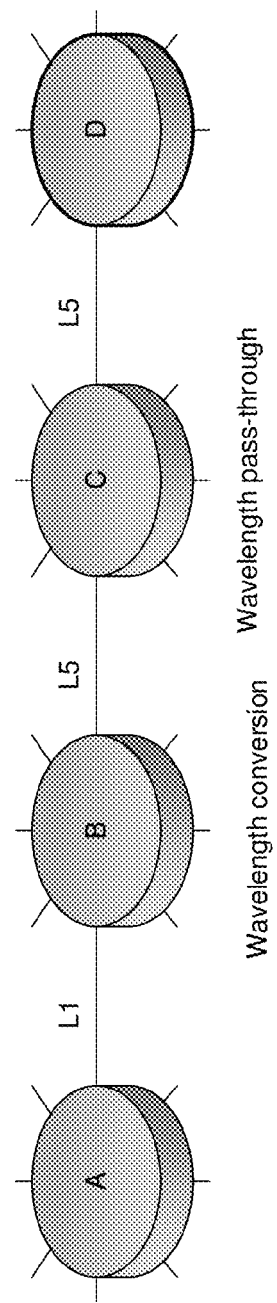

CONFIGURATION DATA

BACKGROUND OF THE INVENTION

1. Field of the Invention

The present disclosure relates to optical networks. In particular, but not exclusively, the present disclosure relates to generating path configuration data for optical networks.

2. Description of the Related Technology

Core optical networks for large Internet service providers may consist of very large numbers of network elements (optical routers, switches, etc.) with complex inter-connectivity. Managing these networks to set up dedicated Multiprotocol Label Switching (MPLS) routes between two nodes is a complex task. As the network size increases, the complexity of calculating these routes becomes a Non-deterministic Polynomial-time hard (NP-hard) problem and finding an exact solution computationally becomes unfeasible. Quite often, a network engineer will plan routes by pen-and-paper.

Simplifications in the network representation may be used to calculate computationally near-optimal routes in these complex networks. New ways to simplify the calculation allow computational path calculations that can yield better results than pen-and-paper optimization.

The well-known Dijsktra algorithm can be used to solve least cost paths through simple networks consisting of a set of nodes and weighted links joining the nodes. Optical networks, whilst consisting of a set of nodes (optical switches, amplifiers, etc.) and links (optical links) there-between, are more difficult to handle because they have added degrees of freedom, for example the use of different wavelengths to transmit data along the same link and the ability of the node to either pass-through the wavelength, retransmit the data over a different wavelength or re-pack the data into a new or existing wavelength.

In one scenario, a wavelength is either passed through an optical node directly, i.e. the ingress wavelength is the same as the egress wavelength. In another scenario, an ingress wavelength is converted to a different wavelength at the egress (which may or may not require repacking/reframing of the data). The former scenario is referred to herein as wavelength pass-through and the latter scenario is referred to herein as wavelength conversion.

One known mechanism for generating path configuration data with least cost routing is to represent the network as a graph, where the network graph is expanded to have separate edges for each available wavelength between two nodes. With a large number of available wavelengths on a single fiber, such an expanded graph representation may become excessively large increasing dramatically the network complexity. In some cases, the added complexity may render least cost routing incalculable within a reasonable timeframe.

SUMMARY

According to a first embodiment, there is a method of generating path configuration data for an optical network, the method comprising: performing a least cost path calculation process on a network graph representation of the optical network to generate path configuration data for the optical network, wherein the optical network comprises a plurality of optical nodes connected by optical links, each node in the plurality being configured to transmit incoming data on an ingress optical link at a first wavelength as outgoing data on an egress optical link at the first wavelength or one or more wavelengths different to the first wavelength, wherein performing the least cost path calculation process comprises performing a network graph expansion process on the network graph representation of the optical network to obtain an expanded network graph representation of the optical network, wherein performing the network graph expansion process comprises: determining data identifying the possible expansion paths to each optical node in the plurality, the cost of each path and the available wavelengths for each path; grouping together wavelength and path data for paths of equal cost; and at one or more nodes in the plurality: identifying a subset of one or more wavelengths that have been selected on an ingress link of the one or more nodes which cannot be used on an egress link of the one or more nodes; and performing a wavelength pruning operation comprising pruning the subset of one or more identified wavelengths from the selected wavelengths of the egress link of the one or more nodes in the expanded network graph representation of the optical network.

According to a second embodiment, there is a system for use in generating path configuration data for an optical network, the system comprising at least one processor, and at least one memory including computer program code, the at least one memory and the computer program code being configured to, with the at least one processor, cause the system at least to: perform a least cost path calculation process on a network graph representation of the optical network to generate path configuration data for the optical network, wherein the optical network comprises a plurality of optical nodes connected by optical links, each node in the plurality being configured to transmit incoming data on an ingress optical link at a first wavelength as outgoing data on an egress optical link at the first wavelength or one or more wavelengths different to the first wavelength, wherein performing the least cost path calculation process comprises performing a network graph expansion process on the network graph representation of the optical network to obtain an expanded network graph representation of the optical network, wherein performing the network graph expansion process comprises: determining data identifying the possible expansion paths to each optical node in the plurality, the cost of each path and the available wavelengths for each path; grouping together wavelength and path data for paths of equal cost; and at one or more nodes in the plurality: identifying a subset of one or more wavelengths that have been selected on an ingress link of the one or more nodes which cannot be used on an egress link of the one or more nodes; and performing a wavelength pruning operation comprising pruning the subset of one or more identified wavelengths from the selected wavelengths of the egress link of the one or more nodes in the expanded network graph representation of the optical network.

According to a third embodiment, there is a computer program product comprising a non-transitory computer-readable storage medium having computer readable instructions stored thereon, the computer readable instructions being executable by a computerized device to cause the computerized device to perform a method for generating path configuration data for an optical network, the method comprising: performing a least cost path calculation process on a network graph representation of the optical network to generate path configuration data for the optical network, wherein the optical network comprises a plurality of optical nodes connected by optical links, each node in the plurality being configured to transmit incoming data on an ingress optical link at a first wavelength as outgoing data on an egress optical link at the first wavelength or one or more wavelengths different to the first wavelength, wherein performing the least cost path calculation process comprises performing a network graph expansion process on the network graph representation of the optical network to obtain an expanded network graph representation of the optical network, wherein performing the network graph expansion process comprises: determining data identifying the possible expansion paths to each optical node in the plurality, the cost of each path and the available wavelengths for each path; grouping together wavelength and path data for paths of equal cost; and at one or more nodes in the plurality: identifying a subset of one or more wavelengths that have been selected on an ingress link of the one or more nodes which cannot be used on an egress link of the one or more nodes; and performing a wavelength pruning operation comprising pruning the subset of one or more identified wavelengths from the selected wavelengths of the egress link of the one or more nodes in the expanded network graph representation of the optical network.

According to a fourth embodiment, there is a method of generating path configuration data for an optical network, the method comprising: performing a least cost path calculation process on a network graph representation of the optical network to generate path configuration data for the optical network, wherein the optical network comprises a plurality of optical nodes connected by optical links including: at least one wavelength pass-through optical node configured to transmit incoming data on an ingress optical link at a first wavelength as outgoing data on an egress optical link at the first wavelength only; and at least one wavelength conversion optical node configured to transmit incoming data on an ingress optical link at a second wavelength as outgoing data on an egress optical link at one or more wavelengths different to the second wavelength, wherein performing the least cost path calculation process comprises performing a network graph expansion process on the network graph representation of the optical network to obtain an expanded network graph representation of the optical network, wherein performing the network graph expansion process comprises, for at least one physical egress link of at least one wavelength conversion optical node, expanding the at least one physical egress link into: a virtual wavelength pass-through egress link, wherein a predetermined pass-through cost is assigned to the operation of the respective wavelength conversion optical node passing through data on an ingress link to the virtual wavelength pass-through egress link at the same wavelength; and a virtual wavelength conversion egress link, wherein a predetermined wavelength conversion cost assigned to the operation of the respective wavelength conversion optical node converting data on an ingress link to one or more different wavelengths on the virtual wavelength conversion egress link, wherein the least cost path calculation process is carried out on the basis of the expanded network graph representation of the network comprising virtual wavelength pass-through and virtual wavelength conversion egress links.

Further embodiments comprise system and/or computer program products according to the fourth embodiments.

Further features of embodiments will become apparent from the following description of preferred embodiments of the disclosure, given by way of example only, which is made with reference to the accompanying drawings.

BRIEF DESCRIPTION OF THE DRAWINGS

FIGS. 8A and 8B show nodes in an optical network according to one or more disclosed embodiments;

DETAILED DESCRIPTION OF CERTAIN INVENTIVE EMBODIMENTS

Figure 1:
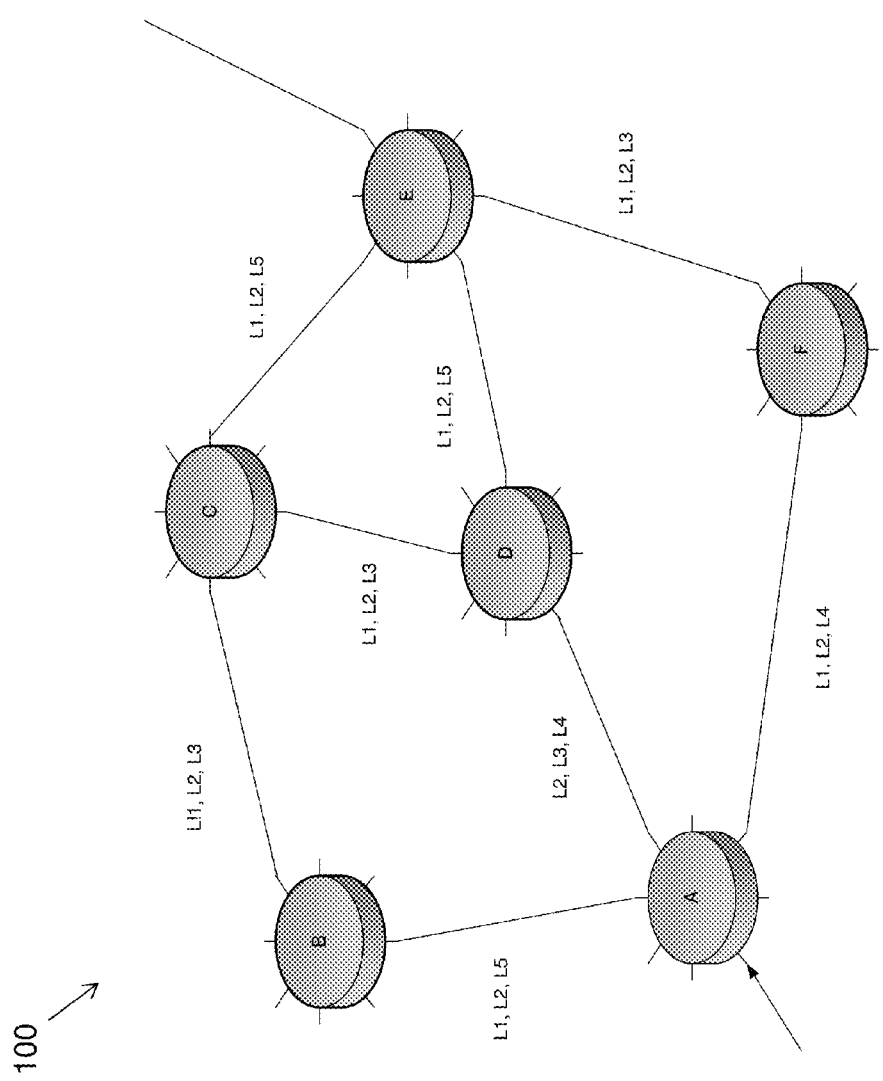
FIG. 1 shows an optical network according to one or more disclosed embodiments.

FIG. 1 shows an example optical network 100 according to embodiments. Optical network 100 comprises six optical nodes, A, B, C, D, E and F with various optical links therebetween. Each of the links has one or more available wavelengths at which data can be passed along that link. For example, on the optical link between optical node A and optical node B, the wavelengths L1, L2 and L5 are available for the transfer of data, whereas on the optical link between optical node C and optical node D, the wavelengths L1, L2 and L3 are available for the transfer of data. The network topology in FIG. 1 is given as an example only and embodiments may be applied to other topologies comprising more (or fewer) than six nodes with differing combinations of available wavelengths on any of the optical links.

Embodiments comprise measures, including methods, systems and computer program products for handling simultaneous least cost routing and wavelength assignment using reduced expansion of a network graph representation of an optical network.

Embodiments employ optical link cost metrics that are average based, and therefore solutions obtained are approximations. In embodiments, an iterative approach may be used to perform multiple calculations to refine the least cost solution.

Embodiments group together wavelength information to reduce the number of calculations, memory storage and/or expansion data than would otherwise be required if expanding the network graph with separate links for each wavelength. In embodiments, the calculation process makes use of least cost path calculations, for example using the Dijkstra algorithm, which deal with a single minimum cost expansion edge. However, embodiments diverge from standard Dijkstra in several ways, for example because different minimum costs for each combination of node, ingress edge and wavelength grouping are employed. Whilst this means that the cost of expansion is greater than Dijkstra, the expanded network graph representation undergoes wavelength pruning to ensure a reduced number of expansions are required, whilst maintaining least-cost groups of wavelengths on each link. In embodiments, some of the calculation can be off-loaded to different threads/processors thus parallelizing some of the calculation.

Embodiments involve performing a bandwidth pruning operation on a network representation of the network to remove links and wavelengths that do not meet one or more bandwidth requirements.

Embodiments involve network graph expansion to add virtual links for handling wavelength pass-through (where wavelengths are equivalent on ingress and egress links), or wavelength conversion optical-electrical-optical (where wavelengths may vary on ingress and egress links).

Embodiments involve applying a routing algorithm to find the least cost path through the network which provides a set of available links and wavelengths on each link.

Embodiments involve assigning the set of wavelengths within the least cost path.

In embodiments, the optical network is represented as a network graph comprising a set of optical nodes (for example optical switches) with links between each node.

In embodiments, the optical network comprises at least one wavelength pass-through optical node configured to transmit incoming data on an ingress optical link at a first wavelength as outgoing data on an egress optical link at the first wavelength only. A wavelength pass-through node is thus a node which supports wavelength pass-through only, i.e. the output wavelength is always ('passed-through') the same as the input wavelength.

In embodiments, the optical network comprises at least one wavelength conversion optical node configured to transmit incoming data on an ingress optical link at a second wavelength as outgoing data on an egress optical link at one or more wavelengths different to the second wavelength or the second wavelength. A wavelength pass-through node is thus a node which supports wavelength pass-through and also wavelength conversion, i.e. the output wavelength may be the same as the input wavelength or the output wavelength may be different from the input wavelength.

In embodiments, the data associated with each link is initialized with an average cost metric for hopping between links where no wavelength conversion is required (optical pass-through).

In embodiments, the data associated with each link is initialized with an average cost metric for hopping between links where wavelength conversion is required. This represents an average cost of a node to convert between wavelengths.

In embodiments, the data associated with each link is initialized with a list of wavelengths and the available bandwidth for each wavelength on that link.

In embodiments, the data associated with each link is initialized with a connectivity matrix describing how ingress and egress links on the node may be connected.

Embodiments comprise measures including methods, systems and computer program products for generating path configuration data for an optical network. A least cost path calculation process is performed on a network graph representation of the optical network to generate path configuration data for the optical network. The optical network comprises a plurality of optical nodes connected by optical links and each node in the plurality is configured to transmit incoming data on an ingress optical link at a first wavelength as outgoing data on an egress optical link at the first wavelength or one or more wavelengths different to the first wavelength. In such embodiments, performing the least cost path calculation process comprises performing a network graph expansion process on the network graph representation of the optical network to obtain an expanded network graph representation of the optical network. In such embodiments, performing the network graph expansion process comprises determining data identifying the possible expansion paths to each optical node in the plurality, the cost of each path and the available wavelengths for each path, grouping together wavelength and path data for paths of equal cost, and at one or more nodes in the plurality identifying a subset of one or more wavelengths that have been selected on an ingress link of the one or more nodes which cannot be used on an egress link of the one or more nodes, and performing a wavelength pruning operation comprising pruning the subset of one or more identified wavelengths from the selected wavelengths of the egress link of the one or more nodes in the expanded network graph representation of the optical network.

The wavelength pruning operation leads to a less complex network graph representation of the network.

In some embodiments, the plurality of nodes comprises at least one wavelength pass-through optical node configured to transmit incoming data on an ingress optical link at the first wavelength as outgoing data on an egress optical link at the first wavelength only, and the one or more nodes comprise the at least one wavelength pass-through optical node. In some embodiments, the plurality of nodes comprises at least one wavelength conversion optical node configured to transmit incoming data on an ingress optical link at a second wavelength as outgoing data on an egress optical link at one or more wavelengths different to the second wavelength, and the one or more nodes comprise the at least one wavelength conversion optical node. Embodiments do not involve naively expanding the network graph to have separate edges for each available wavelength between two nodes as in known systems.

In embodiments, the network graph representation of the network is expanded to double up each link into two virtual links, where the available wavelengths on each virtual link are identical, but one link is marked as a "wavelength pass-through" link with a cost associated with a wavelength pass-through operation and the other link marked as a "wavelength conversion" link with a cost associated with a wavelength conversion operation.

In embodiments, the plurality of nodes comprises at least one wavelength pass-through optical node configured to transmit incoming data on an ingress optical link at the first wavelength as outgoing data on an egress optical link at the first wavelength only, and at least one wavelength conversion optical node configured to transmit incoming data on an ingress optical link at a second wavelength as outgoing data on an egress optical link at one or more wavelengths different to the second wavelength. In such embodiments, performing the network graph expansion process comprises, for at least one physical egress link of at least one wavelength conversion optical node, expanding the at least one physical egress link into at least one of a virtual wavelength pass-through egress link, wherein a predetermined pass-through cost is assigned to the operation of the respective wavelength conversion optical node passing through data on an ingress link to the virtual wavelength pass-through egress link at the same wavelength, and a virtual wavelength conversion egress link, wherein a predetermined wavelength conversion cost assigned to the operation of the respective wavelength conversion optical node converting data on an ingress link to one or more different wavelengths on the virtual wavelength conversion egress link. In such embodiments, the least cost path calculation process is carried out on the basis of the expanded network graph representation of the network comprising virtual wavelength pass-through and virtual wavelength conversion egress links.

In embodiments, the predetermined wavelength conversion cost is higher than the predetermined wavelength pass-through cost.

Having separate links for both costs simplifies the processing for grouping together equal cost routes according to embodiments. In embodiments employing connectivity matrices, a connectivity matrix used to determine cross connectivity between links then only has to deal with which wavelengths are "transmitted" on each egress link without having separate costs for each wavelength.

Figure 2:
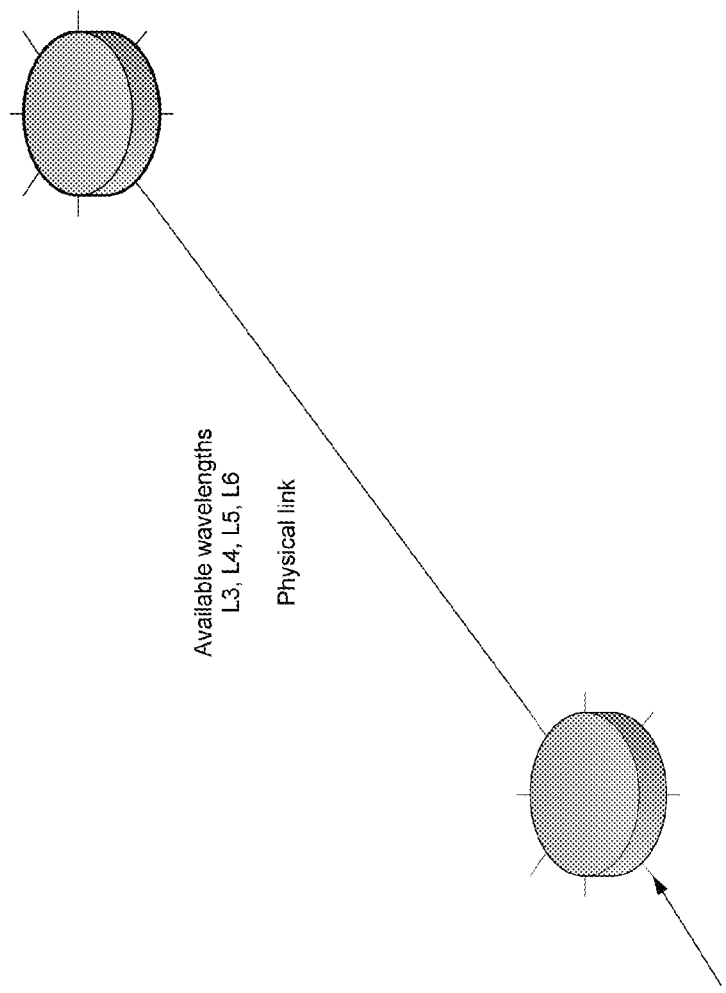
FIG. 2 shows nodes in an optical network according to one or more disclosed embodiments.

FIG. 2 shows a physical link between two optical nodes with available wavelengths marked according to embodiments.

Figure 3:
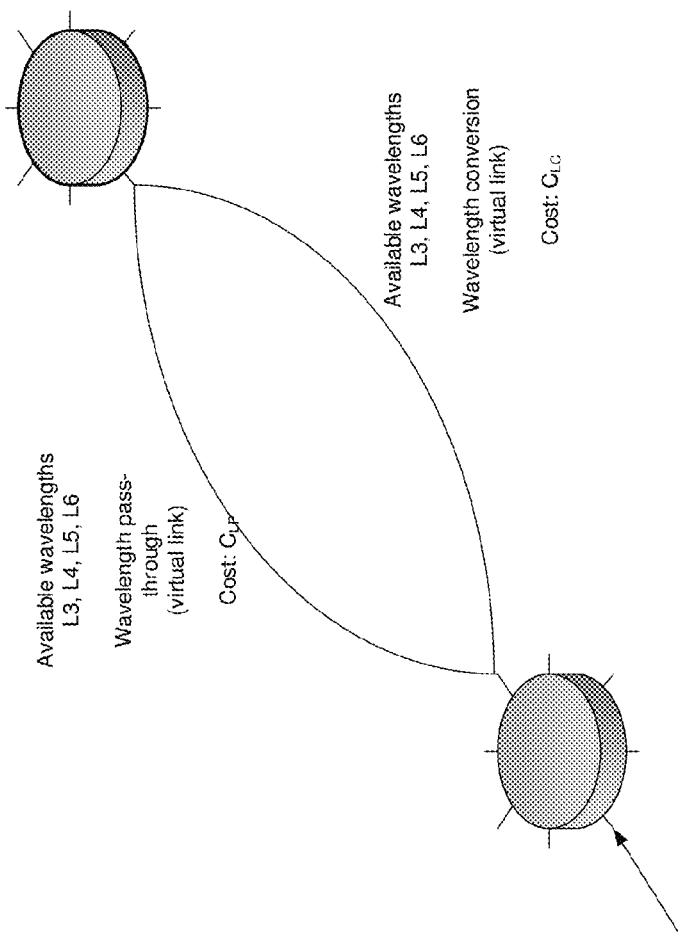
FIG. 3 shows nodes in an optical network according to one or more disclosed embodiments.

FIG. 3 shows that the physical link of FIG. 2 has been replaced in the expanded graph representation of the optical network with two links each with the same available wavelengths, but with different cost metrics for each link depending on whether the link is using wavelength conversion or wavelength pass-through according to embodiments.

Embodiments employ a routing mechanism which builds upon standard Dijkstra where paths are expanded from the least cost route first (utilizing a processing heap to maintain efficient ordering of paths based on cost). Standard Dijkstra expands from each node once because it is only concerned about the least cost path to that node and it expands using the least cost paths first. However, embodiments may employ multiple possible routes to a node due to the different costs for different groups of wavelengths. Embodiments make gains over a simple graph expansion for every single possible wavelength by keeping groups of wavelength-paths together that have identical costs.

Figure 4:
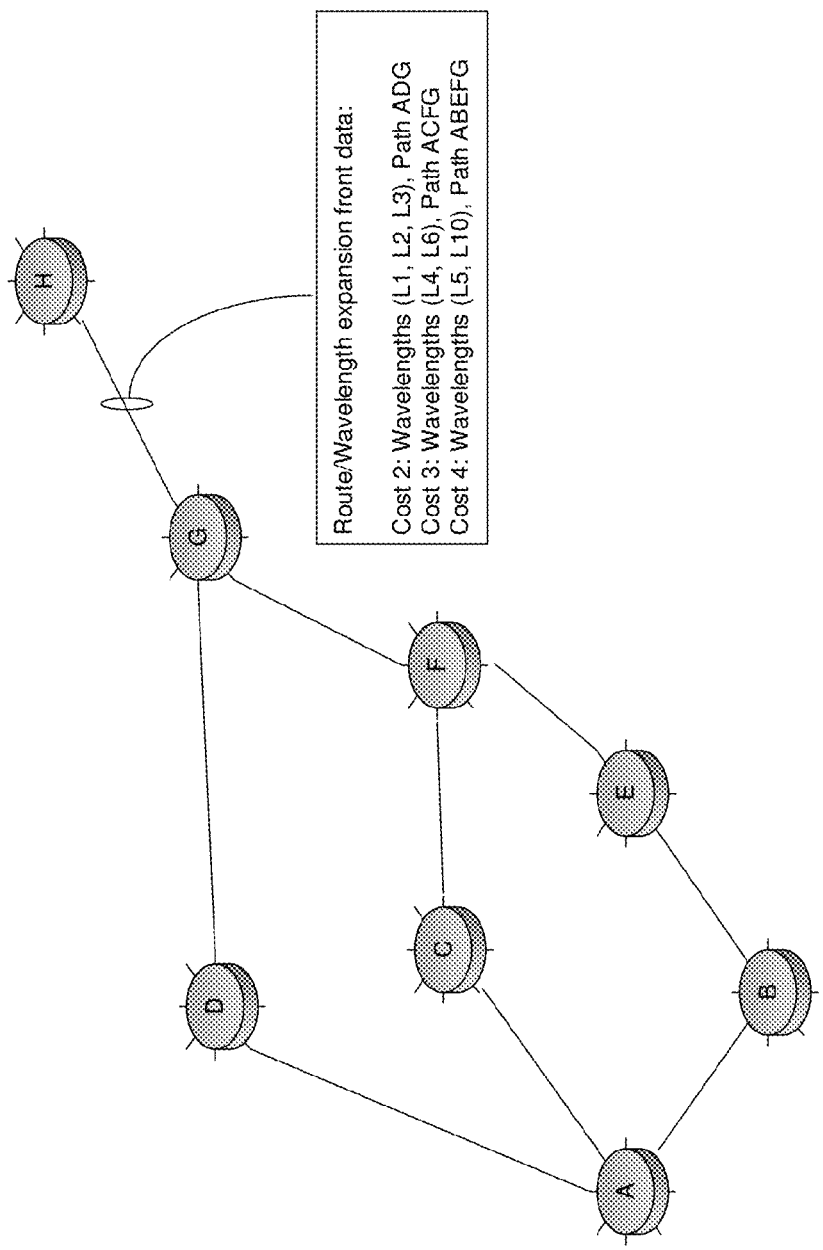
FIG. 4 shows an optical network according to one or more disclosed embodiments.

Embodiments comprise, for each ingress link to a node, keeping track of the least cost paths for a group of possible wavelengths for each link. FIG. 4 shows an example application of such embodiments where it can be seen that for each ingress node, the expansion paths that are used to reach that node are noted, along with the cost of the path and the available wavelengths for that particular path. As with Dijkstra, all paths are put on a processing heap and expanded least cost first. For the example embodiments depicted in FIG. 4, it can be seen that path ADG has a cost of 2 and available wavelengths of L1, L2 and L3; path ACFG has a cost of 3 and available wavelengths of L4 and L6; and path ABEFG has a cost of 4 and available wavelengths of L5 and L10. In this example embodiment, each link has an equal cost, but this need not be the case and in other embodiments, the costs for different links may vary.

Embodiments comprise expanding a path by selecting a particular egress link and selecting wavelengths on the egress link based on the selected wavelengths on the ingress link, the available wavelengths on the egress link and whether the link represents a wavelength conversion virtual link or a wavelength pass-through virtual link.

In embodiments, performing the network graph expansion process comprises, at the least one wavelength conversion optical node, selecting wavelengths on the virtual wavelength pass-through egress link and virtual wavelength conversion egress link of the at least one wavelength conversion optical node on the basis of the wavelengths selected on the ingress link, the available wavelengths on the physical egress link and whether the egress link is a virtual wavelength pass-through egress link or a virtual wavelength conversion egress link.

In some embodiments, identifying the subset of one or more wavelengths for a given node in the one or more nodes comprises determining the intersection between the selected wavelengths on the ingress link of the given node and the available wavelengths on the physical egress link of the given node, and the pruned subset of one or more identified wavelengths comprises the wavelengths which are determined not to be in the intersection.

In embodiments, performing the network graph expansion process comprises, at the least one wavelength conversion optical node, selecting wavelengths on the virtual wavelength conversion egress link of the at least one wavelength conversion optical node to be all of the available wavelengths on the physical egress link of the at least one wavelength conversion optical node.

In embodiments, prior to performing the wavelength pruning operation, the available wavelengths on each of the first virtual wavelength pass-through egress link and the second virtual wavelength conversion egress link of the at the least one wavelength conversion optical node comprise the available wavelengths on the physical egress link for the at least one wavelength conversion optical node. If a node in the network cannot perform optical wavelength pass-through or optical wavelength conversion, then the corresponding virtual link can be omitted from the expanded network graph representation of the optical network.

In embodiments, the wavelengths on the egress link are selected such that, if the egress link is a wavelength pass-through link then the selected wavelengths are the intersection of the selected wavelengths on the ingress link and the available wavelengths on the egress link, and if the egress link is a wavelength conversion link then the selected wavelengths are the complete set of available wavelengths on that link.

Figure 5A:
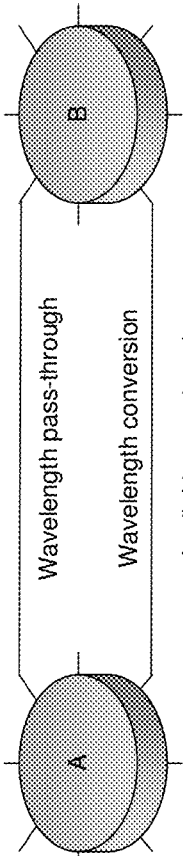
FIGS. 5A and 5B show nodes in an optical network according to one or more disclosed embodiments.
Figure 5B:
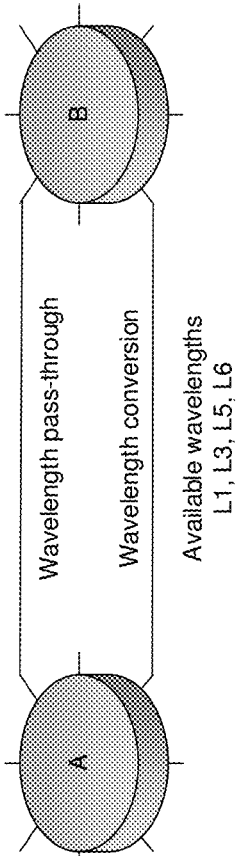

For example, the two egress links in a part of an optical network shown in FIG. 5A are being expanded and pruned where possible. The wavelength pass-through link will have wavelengths L1 and L3 selected, whereas the wavelength conversion link will have wavelengths L1, L3, L5 and L6 selected. Such a pruned expansion is depicted in FIG. 5B.

Note that in embodiments when expanding the egress link, it can be guaranteed that the cost of the paths on the ingress link are the cheapest cost for the selected wavelengths (since Dijkstra expands cheapest paths first, it is guaranteed that only higher or equal cost routes will use those wavelengths on that link). Once those wavelengths are selected, those wavelengths can be pruned from the list of available lambdas on the ingress link; this means that future path calculations that traverse that link from other path/wavelength combinations do not consider the pruned wavelengths as available.

In embodiments, only the least cost route for each wavelength is stored, so although there are multiple costs associated with each ingress edge, each wavelength will appear on only one cost grouping. Note that there is additional overhead in performing the wavelength pruning, however, this pruning is distinct from the actual cost ordering and therefore does not affect the processing heap used for the network graph expansion. This means that this processing can be pushed to another thread/core; in some embodiments, suitable locking is applied to ensure pruning for a set of wavelengths between two nodes has completed before expanding any further routes between the two same nodes.

Some embodiments comprise, prior to performing the network graph expansion process, identifying at least one wavelength available on at least one optical link which has an associated available bandwidth which falls below a predetermined minimum bandwidth threshold, and pruning the identified at least one available wavelength from the available wavelengths on at least one optical link from the network graph representation of the optical network In such embodiments, an available bandwidth pruning operation is performed on the network graph representation of the optical network to remove wavelengths whose available bandwidth does not meet one or more required constraint(s) imposed by a required bandwidth for one or more routes.

In some embodiments, in response to the available bandwidth pruning operation leaving the at least one optical link with no further available wavelengths, the at least one optical link is pruned from the network graph representation of the optical network.

In such embodiments, after an available bandwidth pruning operation has been performed on the network graph representation of the optical network to prune wavelengths from a given link, if there are no longer any available wavelengths on the given link, then the given link is removed entirely from the network graph representation of the network. Such embodiments reduce the total number of edges (and possibly nodes) in the least cost path calculation.

Figure 6:
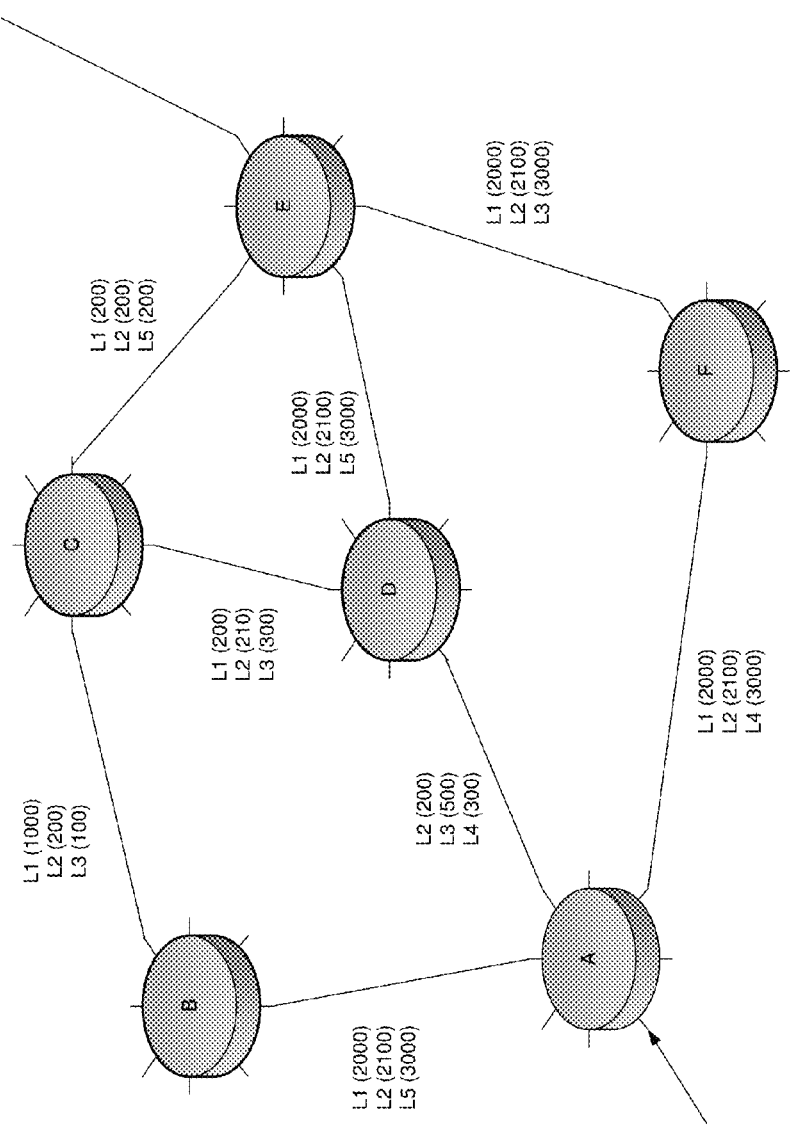
FIG. 6 shows an optical network according to one or more disclosed embodiments.

An example optical network where optical links have different bandwidth capabilities is depicted in FIG. 6. The optical network depicted in FIG. 6 has a similar topology to that depicted in FIG. 1; in FIG. 6, however, each of the available wavelengths on a link has an associated available bandwidth for transmission of data at the respective wavelength. For example, as can be seen in FIG. 6, the link between nodes A and B has available wavelengths of L1, L2 and L5 which have available bandwidths of 2000, 2100 and 3000 respectively, whereas the link between nodes C and D has available wavelengths of L1, L2 and L3 which have available bandwidths of 200, 210 and 300 respectively. The available bandwidths for wavelengths on the links are given in arbitrary units, but could for example comprise hertz.

Figure 7:
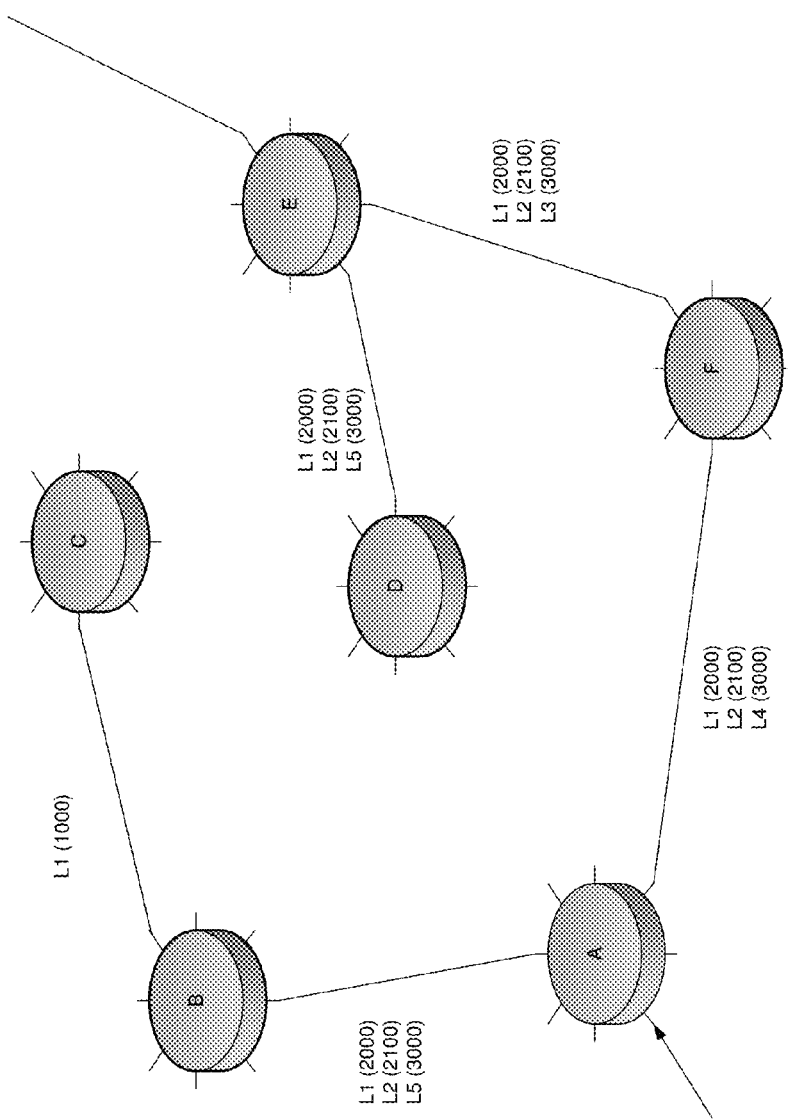
FIG. 7 shows an optical network according to one or more disclosed embodiments.

FIG. 7 depicts the optical network of FIG. 6 after an available bandwidth pruning operation has been performed on the network graph representation of the optical network. In this example, the required bandwidth for each of the paths was 1000 (arbitrary units), such that any wavelengths with available bandwidths less than 1000 are pruned from the network graph representation of the optical network. In this example, the available bandwidth pruning operation removed all available bandwidths from the link between node A and node D, the link between node C and node D, and the link between node C and node E, so these links are pruned from the network graph representation of the optical network entirely.

Some embodiments involve wavelength assignment where paths through the network are selected. Some such embodiments comprise, for each path produced by the least cost path calculation process, performing a wavelength assignment operation to select wavelengths for navigating each of the links comprised in the respective path in a reverse direction to the least cost path calculation process; in such embodiments, the output of the wavelength assignment operation comprises path configuration data for the optical network.

For a given selected path, each egress link in the selected path has a new set of wavelengths that could be valid based on the selected ingress wavelengths and the available egress wavelengths. Once the path is selected, the actual wavelength assignment is established by selecting wavelengths navigating the path in reverse applying one or more wavelength assignment rules.

In embodiments, one such wavelength assignment rule comprises for the last link in the expanded graph representation of the network, a wavelength is chosen from the list of selected wavelengths. In some embodiments, all wavelengths are treated with equal weight, such that the selection of the wavelength is arbitrary. In other embodiments, different wavelengths have different weightings and some wavelengths are preferentially selected over other wavelengths. In some embodiments, it may be preferential to select a specific wavelength.

In embodiments, another such wavelength assignment rule comprises, for the previous link, if the node is acting as a wavelength pass-through node then the wavelength on this (ingress) link should be the same as the other (egress) link, whereas if the node is acting as a wavelength conversion node then an arbitrary wavelength is chosen from the list of selected wavelengths on this (ingress) link. In alternative embodiments, instead of an arbitrary choice, one or more wavelengths could be preferentially chosen over one or more other wavelengths.

In embodiments, performing the wavelength assignment operation for a given path comprises, for a given egress link of a given node, if the given node comprises a wavelength pass-through optical node configured to transmit incoming data on an ingress optical link at the first wavelength as outgoing data on an egress optical link at the first wavelength only, then the wavelength assigned for the ingress link to the given node is the same as the selected wavelength on the ingress link.

In embodiments, performing the wavelength assignment operation for a given path comprises, for a given egress link of a given node, if the given node comprises a wavelength conversion optical node configured to transmit incoming data on an ingress optical link at a second wavelength as outgoing data on an egress optical link at one or more wavelengths different to the second wavelength, then the wavelength assigned for the ingress link to the given node is chosen arbitrarily from the list of selected wavelengths on the ingress link. In alternative embodiments, instead of an arbitrary assignment, one or more wavelengths could be preferentially assigned over one or more other wavelengths.

In embodiments, the least cost path calculation process is performed on the expanded network graph representation of the network in a forward direction from a first node in the network to a second node in the network and the wavelength assignment operation is performed on the expanded network graph representation of the network in a reverse direction from the second node in the network to the first node in the network.

In embodiments, performing the wavelength assignment operation for a given path comprises for the ingress link of the second node, arbitrarily assigning a wavelength from a list of selected wavelengths on the ingress link of the second node. In alternative embodiments, instead of an arbitrary assignment, one or more wavelengths could be preferentially assigned over one or more other wavelengths.

An example wavelength assignment operation for a given path is depicted in FIGS. 8A and 8B according to embodiments. FIG. 8A shows the given path before the wavelength assignment operation has been carried out where the selected wavelengths are specified on each link, and the nodes are marked according to whether they are acting as a wavelength conversion node or a wavelength pass-through node.

Starting from the final link on the path, wavelength L5 is selected on the link between node D and node C (in this example, an arbitrary choice from the list of wavelength L5 and wavelength L7). Node C is a wavelength pass-through node so the wavelength on the link between node C and nod B is also selected as wavelength L5. Node B is a wavelength conversion node so the wavelength on the link between node B and node A is selected as wavelength L1 (in this example, an arbitrary choice from the list of wavelength L1, wavelength L2, wavelength L3 and wavelength L4). FIG. 8B shows the given path after the wavelength assignment operation has been carried out.

In some embodiments described herein, the routing process excludes routing back to a node that is already in the route, for example routing from node X-Y-Z-Y, where routing back to Y is disallowed. Such embodiments prevent routing loops that could make the graph expansion too unwieldy.

However, in some embodiments by allowing a small (for example fixed) number of repeat nodes (or selecting repeatable links or nodes), it is possible to engineer routes with 'hairpins' or similar forms to utilize an optical node that is able to perform wavelength conversion for navigating through another section of the network that is unable to perform wavelength conversion, but where it may be required due to lack of available wavelengths.

Embodiments comprise performing the network graph expansion process such that at least one wavelength conversion optical node configured to transmit incoming data on an ingress optical link at a second wavelength as outgoing data on an egress optical link at one or more wavelengths different to the second wavelength and at least one ingress optical link thereto and at least one egress optical link therefrom form the tip of a hairpin in the network graph representation of the optical network in order to provide wavelength conversion capabilities in at least one part of the optical network where it would otherwise not be possible to provide wavelength conversion capabilities due to a lack of available wavelengths in the at least one part of the optical network.

Bi-directional Dijkstra is an extension to the basic Dijkstra algorithm whereby the network graph representation is expanded simultaneously from both a source and destination until the two expansion processes meet. This can greatly reduce the overall number of expansions. Some embodiments make use of such a bi-directional approach with some modifications. Bi-directional Dijkstra only needs both expansion directions to meet at a particular node. In embodiments, expansion beyond a common node is carried out to find a common expansion link (i.e. the link needs to overlap from both sides of the expansion); such features are employed in embodiments because the selected wavelengths on a particular link from both directions of the expansion should overlap.

In embodiments, the least cost path calculation process is performed as a bi-directional least cost path calculation process on a network graph representation of the optical network, the bidirectional least cost path calculation process comprising a forward direction network graph expansion process starting at a first node in the network and a reverse direction network graph expansion process starting from a second, different node in the network; in such embodiments, the forward and reverse direction network graph expansion processes continue until they meet at a common optical link between two optical nodes in the network.

Figure 9:
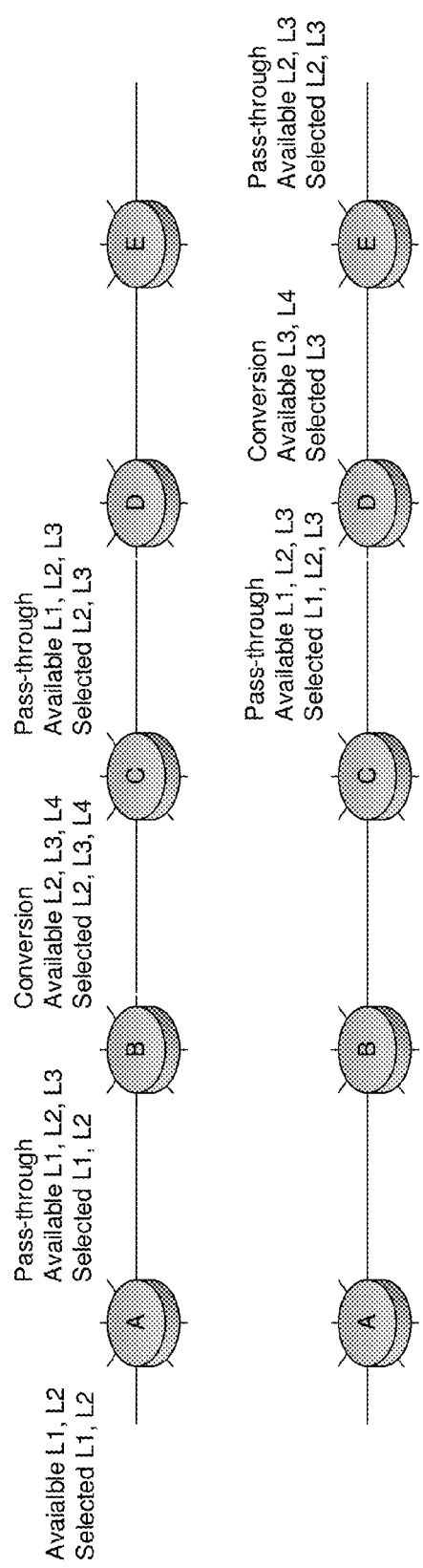
FIG. 9 shows nodes in an optical network according to one or more disclosed embodiments.

For example, consider the following forward (from left to right in the upper part of FIG. 9) and reverse path (from right to left in the lower part of FIG. 9) expansions which overlap on the "pass-through" link between node C and node D as depicted in FIG. 9 according to embodiments. Note that in the reverse path calculation, the selection of wavelengths on the ingress link (where the ingress link refers to the true ingress link if the path was taken in the forward direction) is calculated based on the link type of the egress link and the available wavelengths on the ingress link. In the example of FIG. 9, for the ingress link between node C and node D, the egress link between node D and node E is a wavelength conversion link; this means that the selected wavelengths for the link between node C and node D can be the full list of available wavelengths on the link between node C and node D.

In the example depicted in FIG. 9, the overlapping link between node C and node D has wavelengths L2 and L3 in common.

Figure 10:
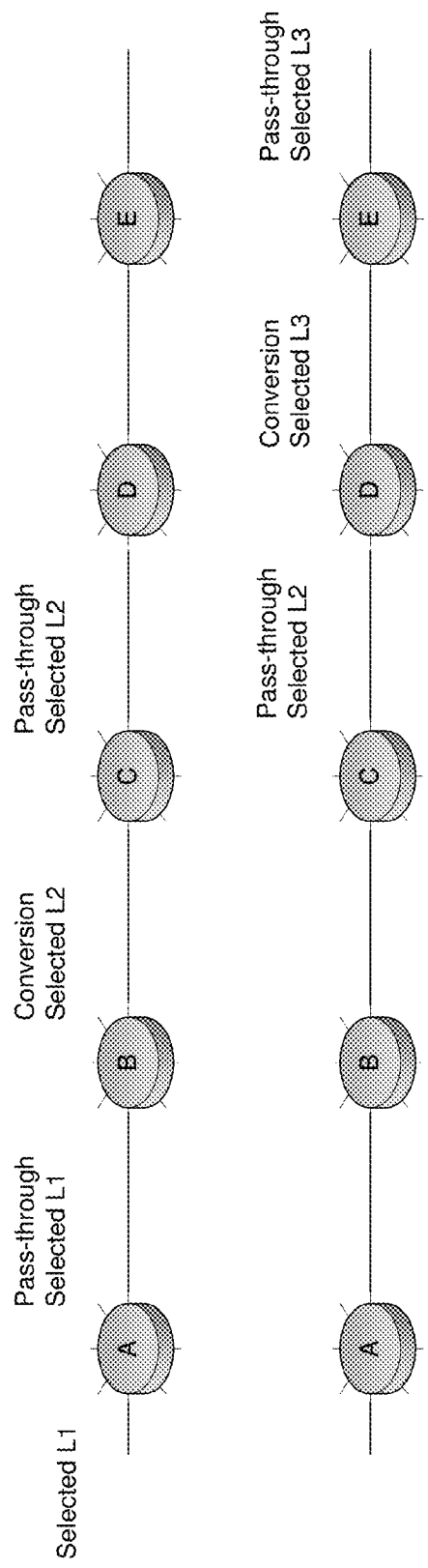
FIG. 10 shows nodes in an optical network according to one or more disclosed embodiments.
Figure 11:
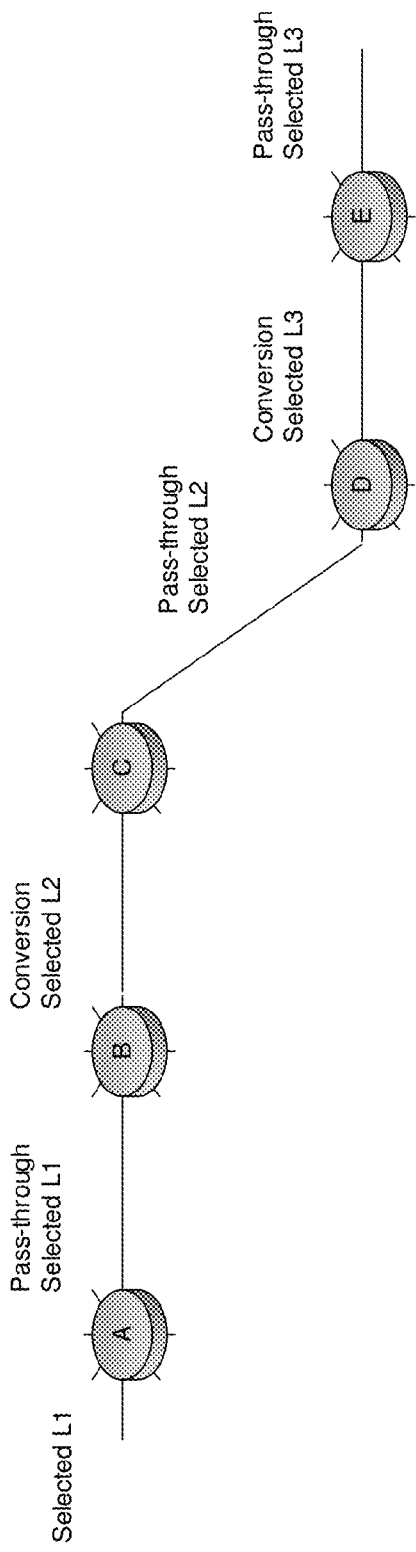
FIG. 11 shows nodes in an optical network according to one or more disclosed embodiments.

The selection of a single wavelength for each link can be performed in the reverse direction of each of the calculated routes starting from the overlapping link. For example, wavelength L2 can be selected as an arbitrary wavelength (or alternatively, a preferentially selected wavelength) from the list of common wavelengths in the overlapping link between node C and node D. From this, the wavelengths for each portion of the path can be chosen as depicted in FIG. 10; here the two portions of the path are for the forward direction, from the ingress of node A to node B to node C and the common link between node C and node D depicted in the upper part of FIG. 10, and for the reverse direction, from the egress of node E to node D and the common link between node D and node C depicted in the lower part of FIG. 10). From this, both the forward route and the reverse route can be combined to form a single complete route as depicted in FIG. 11.

Embodiments comprise configuring one or more nodes in the plurality of optical nodes to route data according to the path configuration data generated for the optical network.

Embodiments comprise a network of optical nodes configured to route data on the basis of path configuration data generated according to the embodiments described herein.

In some embodiments, a constraint based routing approach may be used for multi-constraint based routing by utilizing heuristics to provide faster convergence on an approximate solution. For example, a mechanism for handling multiple constraints might involve additional graph pruning to remove nodes that do not meet any of the individual constraints. Another example may comprise routing which involves applying a heuristic (such as Lagrangian Relaxation) to provide modified cost metrics that include constraint information.

The standard Dijkstra algorithm does not lend itself to multi-threaded (or multi-core) processing since there is effectively a single calculation for each routing-front expansion which needs to be completed and added to a processing heap before selecting the next route expansion node (Dijsktra always expands from the least cost node). However, unlike standard Dijkstra, embodiments described herein contain multiple expansion processes that could at least in part be run on multiple threads. This is extremely useful when utilizing multi-core processors to maximize performance of the graph expansion.

In some embodiments, a main expansion processing thread handles the expansion of the lowest cost path on the heap. As part of the node expansion, the wavelengths on each egress link are calculated. In embodiments, this wavelength expansion is handled on a separate thread which can significantly reduce the impact of handling the wavelength calculations.

In embodiments, the network graph expansion process and the subset identification and bandwidth pruning operation are carried out at least in part in parallel by separate processing threads. In embodiments, the network graph expansion process and the wavelength assignment process are carried out at least in part in parallel by separate processing threads. In embodiments, the subset identification and bandwidth pruning operation and the wavelength assignment process are carried out at least in part in parallel by separate processing threads.

Although the wavelength expansion may be handled separately from the main graph expansion thread, in some embodiments locking is employed to ensure that only one thread is updating the wavelength data for any given node at any one time. There may therefore be some situations where a wavelength expansion thread blocks the main expansion processing thread for a period of time. Such blocking events would be infrequent, however, for a large graph expansion.

Embodiments comprise measures including methods, systems and computer program products for generating path configuration data for an optical network. A least cost path calculation process is performed on a network graph representation of the optical network to generate path configuration data for the optical network. The optical network comprises a plurality of optical nodes connected by optical links including at least one wavelength pass-through optical node configured to transmit incoming data on an ingress optical link at a first wavelength as outgoing data on an egress optical link at the first wavelength only, and at least one wavelength conversion optical node configured to transmit incoming data on an ingress optical link at a second wavelength as outgoing data on an egress optical link at one or more wavelengths different to the second wavelength.

In such embodiments, performing the least cost path calculation process comprises performing a network graph expansion process on a network graph representation of the optical network to obtain an expanded network graph representation of the optical network. Performing the network graph expansion process comprises, for at least one physical egress link of at least one wavelength conversion optical node, expanding the at least one physical egress link into a virtual wavelength pass-through egress link where a predetermined pass-through cost is assigned to the operation of the respective wavelength conversion optical node passing through data on an ingress link to the virtual wavelength pass-through egress link at the same wavelength, and a virtual wavelength conversion egress link where a predetermined wavelength conversion cost is assigned to the operation of the respective wavelength conversion optical node converting data on an ingress link to one or more different wavelengths on the virtual wavelength conversion egress link. The least cost path calculation process is carried out on the basis of the expanded network graph representation of the network comprising virtual wavelength pass-through and virtual wavelength conversion egress links.

The above embodiments are to be understood as illustrative examples of the disclosure. Further embodiments of the disclosure are envisaged.

Embodiments described herein employ average cost values for optical links. In some situations, using an average cost per link might not provide an accurate reflection of the real network. In further embodiments, multiple path calculations are performed using a for example) random selection of averages and comparing results with real cost metrics inserted after the path calculation.

Yet further embodiments involve adding additional virtual links into the graph representation of the network for different conversion scenarios. In such embodiments, instead of employing two types of virtual links, three types of virtual link could be employed, for example wavelength pass-through, wavelength conversion (no reframing), and reframing (wavelength may or may not require conversion). The latter two types of virtual link could be referred to as two different types of translation virtual links. In such embodiments, each physical link would be split into three virtual links (or even more if different layers of reframing are to be handled differently).

In embodiments, embodiments are carried out by apparatus (or 'device' or 'system') such as a network node, switch, server, etc. Embodiments may be carried out in a distributed manner across multiple apparatus. Such apparatus may for example comprise a computerized device which may for example comprise a processor and/or processing system. One or more of the aspects of the embodiments described herein with reference to the drawings comprise processes performed by an apparatus. In embodiments, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of generating path configuration data for an optical network, the method comprising:
   performing a least cost path calculation process on a network graph representation of the optical network to generate path configuration data for the optical network;
   wherein the optical network comprises a plurality of optical nodes connected by optical links, each node in the plurality being configured to transmit incoming data on an ingress optical link at a first wavelength as outgoing data on an egress optical link at the first wavelength or one or more wavelengths different to the first wavelength;
   wherein performing the least cost path calculation process comprises performing a network graph expansion process on the network graph representation of the optical network to obtain an expanded network graph representation of the optical network; and
   wherein performing the network graph expansion process comprises:
      determining data identifying possible expansion paths to each optical node in the plurality, a cost of each possible expansion path, and an available wavelengths for each possible expansion path;
      grouping together wavelength and path data for paths of equal cost; and
      at one or more nodes in the plurality:
         identifying a subset of one or more wavelengths that have been selected on an ingress link of the one or more nodes which cannot be used on an egress link of the one or more nodes; and
         performing a wavelength pruning operation comprising pruning the subset of one or more identified wavelengths from the selected wavelengths of the egress link of the one or more nodes in the expanded network graph representation of the optical network.

2. A method according to claim 1, wherein the plurality of nodes comprises at least one wavelength pass-through optical node configured to transmit incoming data on an ingress optical link at the first wavelength as outgoing data on an egress optical link at the first wavelength only,
   wherein the one or more nodes comprise the at least one wavelength pass-through optical node.

3. A method according to claim 1, wherein the plurality of nodes comprises at least one wavelength conversion optical node configured to transmit incoming data on an ingress optical link at a second wavelength as outgoing data on an egress optical link at one or more wavelengths different to the second wavelength, wherein the one or more nodes comprise the at least one wavelength conversion optical node.

4. A method according to claim 1, wherein the plurality of nodes comprises:
at least one wavelength pass-through optical node configured to transmit incoming data on an ingress optical link at the first wavelength as outgoing data on an egress optical link at the first wavelength only; and
at least one wavelength conversion optical node configured to transmit incoming data on an ingress optical link at a second wavelength as outgoing data on an egress optical link at one or more wavelengths different to the second wavelength,
wherein performing the network graph expansion process comprises, for at least one physical egress link of at least one wavelength conversion optical node, expanding the at least one physical egress link into at least one of:
a virtual wavelength pass-through egress link, wherein a predetermined pass-through cost is assigned to an operation of the respective wavelength conversion optical node passing through data on an ingress link to the virtual wavelength pass-through egress link at the same wavelength; and
a virtual wavelength conversion egress link, wherein a predetermined wavelength conversion cost assigned to an operation of the respective wavelength conversion optical node converting data on an ingress link to one or more different wavelengths on the virtual wavelength conversion egress link;
wherein the least cost path calculation process is carried out based on the expanded network graph representation of the network comprising virtual wavelength pass-through and virtual wavelength conversion egress links.

5. The method of claim 4, wherein performing the network graph expansion process comprises, at the least one wavelength conversion optical node, selecting wavelengths on the virtual wavelength pass-through egress link and virtual wavelength conversion egress link of the at least one wavelength conversion optical node based on the wavelengths selected on the ingress link, the available wavelengths on the physical egress link and whether the egress link is a virtual wavelength pass-through egress link or a virtual wavelength conversion egress link.

6. The method of claim 1, wherein identifying the subset of one or more wavelengths for a given node in the one or more nodes comprises determining an intersection between the selected wavelengths on the ingress link of the given node and the available wavelengths on the physical egress link of the given node, and
wherein the pruned subset of one or more identified wavelengths comprises the wavelengths which are determined not to be in the intersection.

7. The method of claim 4, wherein performing the network graph expansion process comprises, at the least one wavelength conversion optical node, selecting wavelengths on the virtual wavelength conversion egress link of the at least one wavelength conversion optical node to be all of the available wavelengths on the physical egress link of the at least one wavelength conversion optical node.

8. The method according to claim 4, wherein, prior to performing the wavelength pruning operation, the available wavelengths on each of the first virtual wavelength pass-through egress link and the second virtual wavelength conversion egress link of the at the least one wavelength conversion optical node comprise the available wavelengths on the physical egress link for the at least one wavelength conversion optical node.

9. The method according to claim 1, comprising, for each path produced by the least cost path calculation process, performing a wavelength assignment operation to select wavelengths for navigating each of the links comprised in the respective path in a reverse direction to the least cost path calculation process,
wherein the output of the wavelength assignment operation comprises path configuration data for the optical network.

10. The method according to claim 9, wherein performing the wavelength assignment operation for a given path comprises:
for a given egress link of a given node, if the given node comprises a wavelength pass-through optical node configured to transmit incoming data on an ingress optical link at the first wavelength as outgoing data on an egress optical link at the first wavelength only, then the wavelength assigned for the ingress link to the given node is the same as the selected wavelength on the ingress link.

11. The method according to claim 9, wherein performing the wavelength assignment operation for a given path comprises:
for a given egress link of a given node, if the given node comprises a wavelength conversion optical node configured to transmit incoming data on an ingress optical link at a second wavelength as outgoing data on an egress optical link at one or more wavelengths different to the second wavelength, then the wavelength assigned for the ingress link to the given node is chosen arbitrarily from the list of selected wavelengths on the ingress link.

12. The method according to claim 9, wherein the least cost path calculation process is performed on the expanded network graph representation of the network in a forward direction from a first node in the network to a second node in the network and the wavelength assignment operation is performed on the expanded network graph representation of the network in a reverse direction from the second node in the network to the first node in the network.

13. The method according to claim 12, wherein performing the wavelength assignment operation for a given path comprises for the ingress link of the second node, arbitrarily assigning a wavelength from a list of selected wavelengths on the ingress link of the second node.

14. The method according to claim 1, comprising, prior to performing the network graph expansion process:
identifying at least one wavelength available on at least one optical link which has an associated available bandwidth which falls below a predetermined minimum bandwidth threshold; and
pruning the identified at least one available wavelength from the available wavelengths on at least one optical link from the network graph representation of the optical network.

15. The method according to claim 14, comprising, in response to the available bandwidth pruning operation leaving the at least one optical link with no further available wavelengths, pruning the at least one optical link from the network graph representation of the optical network.

16. The method according to claim 1, wherein the network graph expansion process and the subset identification and pruning processes are carried out at least in part in parallel by separate processing threads.

17. The method according to claim 9, wherein the network graph expansion process and the wavelength assignment process are carried out at least in part in parallel by separate processing threads.

18. The method according to claim 9, wherein the subset identification and bandwidth pruning operation and the wavelength assignment process are carried out at least in part in parallel by separate processing threads.

19. The method according to claim 1, comprising performing the network graph expansion process such that at least one wavelength conversion optical node configured to transmit incoming data on an ingress optical link at a second wavelength as outgoing data on an egress optical link at one or more wavelengths different to the second wavelength and at least one ingress optical link thereto and at least one egress optical link therefrom form the tip of a hairpin in the network graph representation of the optical network in order to provide wavelength conversion capabilities in at least one part of the optical network where it would otherwise not be possible to provide wavelength conversion capabilities due to a lack of available wavelengths in the at least one part of the optical network.

20. The method according to claim 1, wherein the least cost path calculation process is performed as a bi-directional least cost path calculation process on a network graph representation of the optical network, the bidirectional least cost path calculation process comprising a forward direction network graph expansion process starting at a first node in the network and a reverse direction network graph expansion process starting from a second, different node in the network,
wherein the forward and reverse direction network graph expansion processes continue until they meet at a common optical link between two optical nodes in the network.

21. The method according to claim 4, wherein the predetermined wavelength conversion cost is higher than the predetermined wavelength pass-through cost.

22. The method according to claim 1, comprising configuring one or more nodes in the plurality of optical nodes to route data according to the path configuration data generated for the optical network.

23. A system for use in generating path configuration data for an optical network, the system comprising:
at least one memory including computer program code;
and at least one processor in data communication with the memory, the processor configured to:
perform a least cost path calculation process on a network graph representation of the optical network to generate path configuration data for the optical network,
wherein the optical network comprises a plurality of optical nodes connected by optical links, each node in the plurality being configured to transmit incoming data on an ingress optical link at a first wavelength as outgoing data on an egress optical link at the first wavelength or one or more wavelengths different to the first wavelength,
wherein performing the least cost path calculation process comprises performing a network graph expansion process on the network graph representation of the optical network to obtain an expanded network graph representation of the optical network,
wherein performing the network graph expansion process comprises:
determining data identifying possible expansion paths to each optical node in the plurality, a cost of each path, and an available wavelengths for each path;
grouping together wavelength and path data for paths of equal cost; and
at one or more nodes in the plurality:
identifying a subset of one or more wavelengths that have been selected on an ingress link of the one or more nodes which cannot be used on an egress link of the one or more nodes; and
performing a wavelength pruning operation comprising pruning the subset of one or more identified wavelengths from the selected wavelengths of the egress link of the one or more nodes in the expanded network graph representation of the optical network.

24. A non-transitory computer-readable storage medium comprising computer-executable instructions which, when executed by a processor, cause a computerized device to perform a method for generating path configuration data for an optical network, the method comprising:
performing a least cost path calculation process on a network graph representation of the optical network to generate path configuration data for the optical network,
wherein the optical network comprises a plurality of optical nodes connected by optical links, each node in the plurality being configured to transmit incoming data on an ingress optical link at a first wavelength as outgoing data on an egress optical link at the first wavelength or one or more wavelengths different to the first wavelength,
wherein performing the least cost path calculation process comprises performing a network graph expansion process on the network graph representation of the optical network to obtain an expanded network graph representation of the optical network,
wherein performing the network graph expansion process comprises:
determining data identifying possible expansion paths to each optical node in the plurality, a cost of each path, and an available wavelengths for each path;
grouping together wavelength and path data for paths of equal cost; and
at one or more nodes in the plurality:
identifying a subset of one or more wavelengths that have been selected on an ingress link of the one or more nodes which cannot be used on an egress link of the one or more nodes; and
performing a wavelength pruning operation comprising pruning the subset of one or more identified wavelengths from the selected wavelengths of the egress link of the one or more nodes in the expanded network graph representation of the optical network.

25. A network of optical nodes configured to route data based on path configuration data generated according to the method of claim 1.

26. A method of generating path configuration data for an optical network, the method comprising:
performing a least cost path calculation process on a network graph representation of the optical network to generate path configuration data for the optical network,
wherein the optical network comprises a plurality of optical nodes connected by optical links including:
at least one wavelength pass-through optical node configured to transmit incoming data on an ingress optical link at a first wavelength as outgoing data on an egress optical link at the first wavelength only; and
at least one wavelength conversion optical node configured to transmit incoming data on an ingress optical link at a second wavelength as outgoing data on an egress optical link at one or more wavelengths different to the second wavelength, wherein performing the least cost path calculation process comprises performing a network graph expansion process on the network graph representation of the optical network to obtain an expanded network graph representation of the optical network, wherein performing the network graph expansion process comprises, for at least one physical egress link of at least one wavelength conversion optical node, expanding the at least one physical egress link into:

a virtual wavelength pass-through egress link, wherein a predetermined pass-through cost is assigned to the operation of the respective wavelength conversion optical node passing through data on an ingress link to the virtual wavelength pass-through egress link at the same wavelength; and a virtual wavelength conversion egress link, wherein a predetermined wavelength conversion cost assigned to the operation of the respective wavelength conversion optical node converting data on an ingress link to one or more different wavelengths on the virtual wavelength conversion egress link, wherein the least cost path calculation process is carried out based on the expanded network graph representation of the network comprising virtual wavelength pass-through and virtual wavelength conversion egress links.

* * * * *